United States Patent [19]
Vargiu et al.

[11] 3,905,948
[45] Sept. 16, 1975

[54] PROCESS FOR THE PREPARATION OF PETROLEUM RESINS

[75] Inventors: Silvio Vargiu, Sesto San Giovanni; Edoardo Carpaneti, Genova Bolzaneto; Beppino Passalenti; Pietro Paparatto, both of Milan, all of Italy

[73] Assignee: Societa' Italiana Resine S.I.R. S.p.A.

[22] Filed: Dec. 26, 1973

[21] Appl. No.: 428,577

[30] Foreign Application Priority Data
Dec. 22, 1972 Italy.................................. 33444/72

[52] U.S. Cl............................. 260/82; 260/78.4 D
[51] Int. Cl.²......................................... C08F 15/04
[58] Field of Search....................................... 260/82

[56] References Cited
UNITED STATES PATENTS

| | | | |
|---|---|---|---|
| 2,779,750 | 1/1957 | Fuqua et al............................ | 260/82 |
| 2,837,491 | 6/1958 | McKay................................. | 260/82 |
| 2,946,775 | 7/1960 | de Vries et al. ...................... | 260/82 |

*Primary Examiner*—Harry Wong, Jr.
*Attorney, Agent, or Firm*—Sughrue, Rothwell, Mion, Zinn and Macpeak

[57] ABSTRACT

A process for the preparation of petroleum resins from hydrocarbon fractions containing olefins and di-olefins, having a boiling range of from about 30° to 300°C, which comprises
 a. subjecting said hydrocarbon fraction to pre-polymerization with transformation into high-boiling products in quantities equal to or smaller than about 20 percent by weight with respect to the fraction itself;
 b. subjecting the residual hydrocarbon fraction, after separation of the high-boiling products, to polymerization in the presence of Friedel-Crafts catalysts with conversion into polymer of a quantity equal to or smaller than about 40 percent by weight with respect to the hydrocarbon fraction fed to the pre-polymerization, and
 c. recovering the petroleum resin from the polymerization products.

4 Claims, 1 Drawing Figure

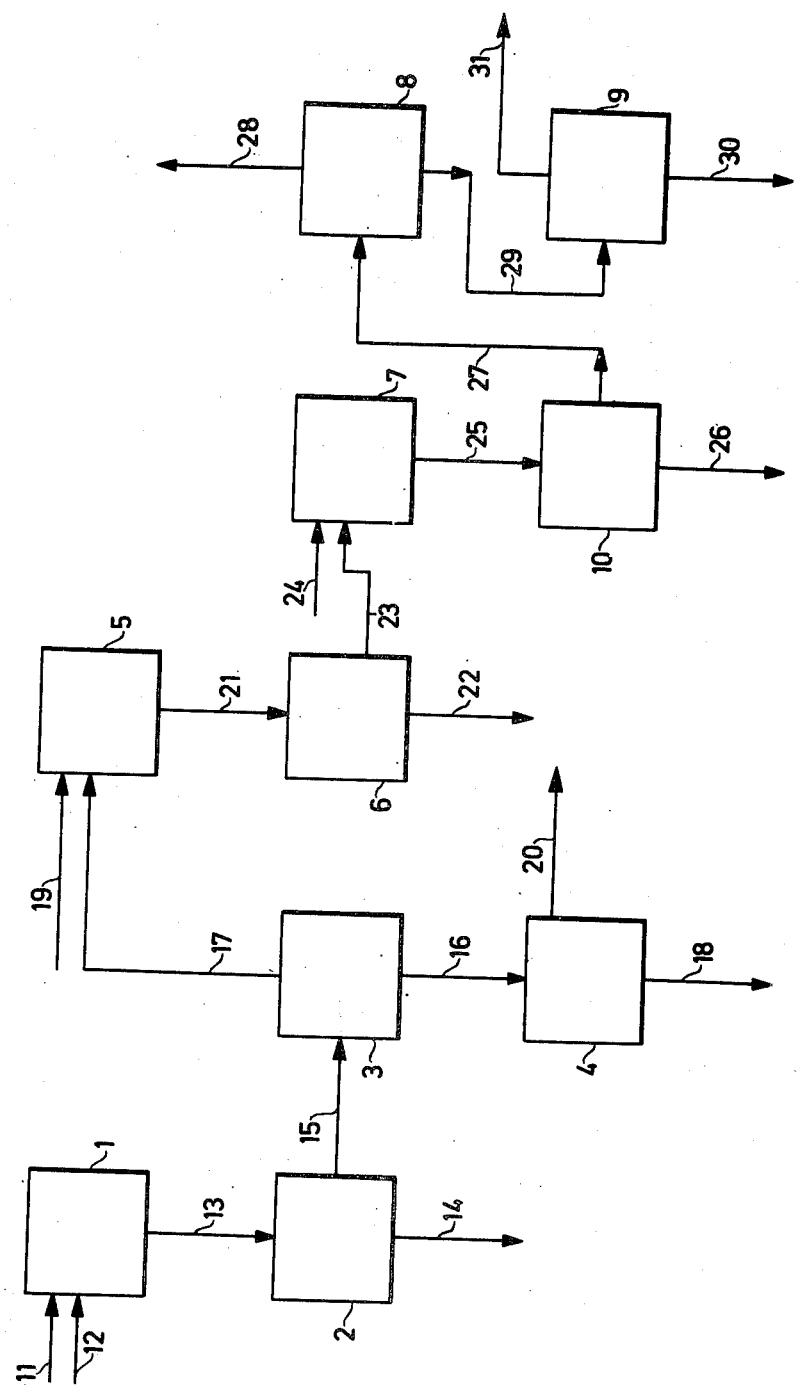

3,905,948

PROCESS FOR THE PREPARATION OF PETROLEUM RESINS

BACKGROUND OF THE INVENTION

1. Field of the Invention

The present invention relates to an improved process for the preparation of petroleum resins. More particularly, the invention relates to a process in which unsaturated fractions of petroleum are subjected to preliminary treatments to produce improved unsaturated hydrocarbon mixtures suitable for polymerization reactions in the production of petroleum resins. The invention also relates to the petroleum resins obtained by said process.

2. Description of the Prior Art

As is known, the petroleum resins or petroleum hydrocarbon resins can be produced from certain hydrocarbon fractions obtained from the treatments for the refinement of petroleum, which contain mixtures of olefins and diolefins. In particular, these hydrocarbon fractions are subjected to polymerization using catalysts of the Friedel-Crafts type. The hydrocarbon fractions obtained from pyrolysis treatments in the presence of water vapour are particularly useful for the purpose. For example, relatively heavy fractions of petroleum, such as naphthas and gas-oils, are subjected to pyrolysis at relatively low pressures and at temperatures in the range of 550° to 850°C in the presence of water vapour. With relatively short contact times, moreover, one obtains products that are rich in olefins and diolefins having from 5 to 10 carbon atoms per molecule, among other substances. More particularly, the liquid hydrocarbon mixtures obtained after separation of the products of the pyrolysis of naphtha in the presence of water vapour boil in a temperature range from 30° to 300°C and contain high quantities of olefins, diolefins, and aromatic compounds and low quantities of paraffinic compounds. The petroleum hydrocarbon resins obtained by direct polymerization of such hydrocarbon mixtures with Friedel-Crafts catalysts have melting points lower than those desired, and their unsaturation degree is also somewhat high.

To obtain improved petroleum resins, attempts have been made in prior art to separate selected fractions from the hydrocarbon mixtures obtained from the petroleum-refining processes and then to polymerize such selected fractions. For this purpose, distillation or solvent extraction was mainly used. However, such methods did not allow the satisfactory separation of the fractions that, on subjection to polymerization, produce petroleum resins having all the desirable characteristics. The distillative processes do not allow the complete separation of the constituents that are undesirable in the polymerization reaction. Nor, on the other hand, was a solvent or mixture of solvents found that was sufficiently selective to allow a complete separation of said undesirable constituents.

In conclusion, the methods described, while allowing the improvement of various characteristics of the petroleum resins, did not allow the melting point of said resins to be raised to a desired level and did not confer on them entirely satisfactory colour characteristics.

Moreover, the prior art processes were so expensive as to have an adverse effect on the economy of the process for the production of petroleum resins.

SUMMARY

One object of the invention is to provide a process for the preparation of petroleum resins, which overcomes the disadvantages of prior art, and gives petroleum resins having excellent characteristics, particularly with regard to the melting point and the colour. Other objects will be apparent from the description and claims following.

The present invention is essentially based on the discovery that the undesirable constituents present in the hydrocarbon mixtures containing olefins and diolefins can be practically completely removed by subjecting said mixtures to a preliminary and limited polymerization under the conditions that will be defined later. This preliminary polymerization treatment will be referred to in the following description as "pre-polymerization."

The invention therefore provides a process for the preparation of petroleum resins from hydrocarbon fractions containing olefins and diolefins, having a boiling range of from about 30° to 300°C, which comprises a. subjecting said hydrocarbon fraction to pre-polymerization with transformation into high-boiling products in quantities equal to or smaller than about 20 percent by weight with respect to the fraction itself;

b. subjecting the residual hydrocarbon fraction, after separation of the high-boiling products, to polymerization in the presence of Friedel-Crafts catalysts with conversion into polymer of a quantity equal to or smaller than about 40 percent by weight with respect to the hydrocarbon fraction fed to the pre-polymerization, and c. recovering the petroleum resin from the polymerization products.

It has been found that by operating in this way, it is possible to obtain petroleum resins having a melting point higher than about 120°C when this melting point is determined by means of a standard Mettler FP 5 apparatus. Said resins also have high characteristics with regard to colour, this colour being less than 12 in every case when the determination is carried out on the Gardner 1933 scale on a 50 wt.% solution of the resin in toluene. Moreover, said resins have a bromine value that is always less than 30 (ASTM D 1158-59 T) and a viscosity lower than Z6, the latter determination being carried out on the Gardner scale at 25°C in 70 percent toluene solution.

The hydrocarbon mixtures that are subjected to the process of the present invention are those containing mixtures of olefins and diolefins and obtained from petroleum-refining treatments. The products obtained by pyrolysis of naphthas and of kerosines at high temperatures and in the presence of water vapour can be used for the purpose. The preferred hydrocarbon mixtures are those obtained from naphtha pyrolysis processes and having a boiling range of from about 30° to 300°C. Among these mixtures, those boiling in a temperature range from about 120 to 220 are particularly preferred. Such hydrocarbon fractions are rich in olefins and diolefins and poor in paraffinic compounds; their bromine value is generally greater than about 95.

The preferred values for the transformation into high boiling products in step a) are in the range of from about 1 to 10 percent by weight. For this purpose, the hydrocarbon mixture is brought into contact with a quantity of from about 2 to 10 parts by weight of activated clays per 100 parts by weight of the mixture itself. The operation is carried out at temperatures of from about 10° to 60°C and for times of from about 1 to 60 minutes. The preferred values for the temperatures and the times are respectively those in the ranges of from about 25° to 35°C and from about 20 to 40 minutes.

The activated clays are products that are widely known in the art, and are described, for example, in Kirk-Othmer "Encyclopedia of Chemical Technology," Vol 4, (1949), p. 53 et seq.

The activated clays are then separated from the pre-polymerization products, for example by centrifuging or filtration, and a hydrocarbon solution of the polymer is recovered in this way. This solution is subjected to distillation in such a way as to recover a hydrocarbon fraction having a maximum boiling point of from about 210° to 230°C. This fraction, which will be referred to as the "selected fraction" or "selected hydrocarbon fraction," is intended for polymerization with Friedel-Crafts catalysts to produce the petroleum resins of the present invention.

The residual hydrocarbons are eliminated from the distillation residue, for example by distillation by the thin-film technique and at a pressure lower than atmospheric pressure. In this way one recovers a resin whose characteristics, on average, are within the following ranges:

melting point: 60°–80°C
bromine value: 50–70
Gardner viscosity at 25°C in 70 percent toluene solution: L-P This resin, which is a by-product, is useful for various purposes, for example in the field of varnishes and adhesives. The usefulness of this by-product helps to make the process of the present invention economically advantageous.

The selected hydrocarbon fraction is preferably brought into contact with a quantity of Friedel-Crafts catalyst of from about 0.1 to 1.0 parts by weight per 100 parts by weight of the fraction itself. Catalysts that can be used for the purpose are aluminum trichloride, aluminium tribromide, and boron trifluoride, which may be added in the reaction zone in the solid form or in the form of solutions or of liquid complexes with hydrocarbons. The polymerization temperatures are generally in the range from about −100° to +100°C, though it is convenient to operate at temperatures of from about 25° to 70°C. The reaction times are normally maintained in the range of from about 20 to 90 minutes.

On operation under these conditions, a quantity of hydrocarbon polymer normally smaller than about 40 parts by weight per 100 parts by weight of the hydrocarbon mixture fed to the prepolymerization, and normally from about 20 to 35 parts by weight, is produced. The catalyst is separated from the polymerization products, for example by centrifuging, and the residual solution is treated in the preferred embodiment with activated clays. For this purpose a quantity of activated clays of from about 2 to 10 parts by weight per 100 parts by weight of the solution is added, and contact is maintained for a time of from about 1 to 60 minutes at temperatures of from about 10° to 60°C. The activated clays are finally separated from the solution.

In another embodiment, the solution is allowed to percolate through the activated clay in the form of a fixed bed, with contact times and temperatures in the ranges defined above.

The treatment of the solution of hydrocarbon polymer with activated clays has the purpose of improving the colour of the polymerization products.

Finally, the low-boiling products are distilled from the solution treated in this way, and petroleum resins are recovered whose typical characteristics are within the following ranges:

melting point: 125°–130°C
bromine value 20–25
Gardner colour in 50 percent toluene solution: 10–12
Gardner viscosity at 25°C in 70 percent toluene solution: Z4–Z5

These petroleum resins are used in industry particularly in the formulation of varnishes, adhesives, and printing inks, in mixtures for tyres and in bitumen-based paving.

Moveover, the petroleum resins of the present invention can be copolymerized with maleic anhydride in the production of copolymers having high characteristics, which are particularly suitable for printing inks. For this purpose, a quantity of from about 5 to 20 parts by weight of maleic anhydride is mixed with about 100 parts by weight of the petroleum resin. The copolymerization is carried out at temperatures of from about 100° to 150°C in the presence of free-radical catalysts such as di-tert-butyl peroxide, cumene hydroperoxide, benzoyl peroxide, tert-butyl hydroperoxide, and dicumyl peroxide. The catalyst is used in a quantity of from about 0.5 to 5.0 parts by weight per 100 parts by weight of the constituents subjected to copolymerization. Moreover, it is preferable to carry out the copolymerization in the presence of an organic solvent, normally aromatic, such as toluene, xylene, and isopropylbenzene.

After separation of any organic solvent added, a copolymer having the following typical characteristics is obtained:

melting point: above 160°C
bromine value: 15–20
acid value: 20–40
Gardner viscosity at 25°C in 60 percent toluene solution: at least Z3

It should be noted that "acid value" means the number of milligrams of potassium hydroxide used for neutralization per gram of copolymer.

The petroleum resins of the present invention can also be copolymerized with other unsaturated monomers and in general with unsaturated acids or their nitriles. Examples of such unsaturated monomers are acrylic and methacrylic acids, itaconic acid, fumaric acid, and acrylonitrile. In every case, products that are regarded as suitable for said purposes are obtained.

The invention is further illustrated by the following non-limiting examples:

EXAMPLE 1

With reference to the attached FIGURE, a hydrocarbon fraction obtained from the pyrolysis products of naphtha with steam, and having the following characteristics:

bromine value: 85
refractive index at 25°C ($n_D^{25}$) : 1.5298
density at 15°C (g/ml) : 0.921
percent water (Karl Fischer method) : about 0.05
acid value: less than 0.01, is fed to the reactor 1. Moreover, 90 percent of said fraction distills in a temperature range from 135° to 228°C. The hydrocarbon fraction is fed through the pipe 11 at a rate of 800 parts by weight per hour.

The activated clay known by the trade name Prolit and produced by Caffaro, is fed to the reactor 1 through the pipe 12 in a quantity of 40 parts by weight per hour. The reactor 1 is operated at a temperature of 30°C with a residence time of 15 minutes, the mass being kept agitated. The reaction product is discharged through the pipe 13 and fed into 2, where it is subjected to centrifuging.

In this way the exhausted activated clay is discharged through the pipe 14, while about 760 parts by weight per hour of a hydrocarbon solution containing the polymer formed in the pre-polymerization phase are discharged through the pipe 15. In particular, this solution has the following characteristics:

dry residue (percent by weight) : 10
Hazen colour: 70-90
bromine value: 75

Said solution is distilled in the distillation column 3 operating at atmospheric pressure, with separation of the selected hydrocarbon fraction having a maximum boiling point of 221°C. This selected fraction, which is discharged through the pipe 17 at a rate of about 580 parts by weight per hour, has the following characteristics:

boiling range: 151°-221°C
bromine value: 75
refractive index at 25°C: 1.5321
density at 15°C: 0.922
percent by weight of water: approx. 0.05
acid value: less than 0.01
Hazen colour: 100.

At the base of the distillation column 3, about 180 parts by weight per hour of the residual solution of the polymer are recovered through the pipe 16. This residual solution is subjected in 4 to distillation by the thin-film technique in a commercial Luwa apparatus operating at a pressure of 720 mmHg. Under these conditions about 104 parts by weight per hour of a hydrocarbon fraction are discharged through the pipe 20, while 76 parts by weight per hour of a hydrocarbon resin having the following characteristics:

melting point: 66°-70°C
bromine value: 65-70
Gardner viscosity at 25°C in 70 percent toluene solution: N - O are recovered at the base of 4 through the pipe 18.

The selected hydrocarbon fraction is fed to the polymerization reactor 5 through the pipe 17 at a rate of about 580 parts by weight per hour. 9.5 parts by weight per hour of the solution of the catalyst consisting of aluminium trichloride (30 percent by weight), nitrobenzene (30 percent by weight) and toluene (40 percent by weight) are fed into the same reactor through the pipe 19. In the reactor 5, the mass is agitated for a contact time of 45 minutes at a temperature of about 50°C. The polymerization product is discharged from the reactor 5 through the pipe 21 and is subjected in 6 to centrifuging for separation of the catalyst.

The exhausted catalyst is discharged through the pipe 22, while the polymer solution discharged through the pipe 23 is fed into 7, where it is brought into contact with the activated clay Prolit mentioned earlier. Said activated clay is fed through the pipe 24 at a rate of 17.5 parts by weight per hour. In the reactor 7 the mass is agitated for a contact time of about 15 minutes at a temperature of 45°-50°C. The product discharged through the pipe 25 is subjected to centrifuging in 10. The exhausted earth is discharged through the pipe 26, while about 550 parts by weight per hour of a solution of the petroleum resin in hydrocarbons are recovered through the pipe 27.

Said solution has the following characteristics:

dry residue (percent by weight): 35-40
Gardner viscosity at 25°C: less than A
Gardner colour: 4
bromine value: 60

The solution is subjected in 8 to distillation in a distillation column operating at atmospheric pressure. At the top of the column, 230 parts by weight per hour of hydrocarbons are discharged through the pipe 28.

The residual solution discharged through the pipe 29 is subjected in 9 to evaporation by the thin-film technique (Luwa evaporator) at 720 mmHg.

A hydrocarbon mixture is recovered through the pipe 31 at a rate of about 114 parts by weight per hour.

At the base of the evaporator 9, 220 parts by weight per hour of a petroleum resin having the characteristics:

melting point: 125°C
content of volatile substances (% by weight): 0.5
bromine value: 21
Gardner colour in 50 percent toluene solution: 10
Gardner viscosity at 25°C in 60 percent toluene solution: H + ¼
Gardner viscosity at 25°C in 70 percent toluene solution: Z4 + ½ are discharged through the pipe 30.

EXAMPLE 2

The following are introduced into a polymerization reactor fitted with a stirrer, a reflux condenser, a system for the introduction of inert gas, and a thermometer: 1000 parts by weight of the petroleum resin obtained as described in example 1, 100 parts by weight of maleic anhydride, and 200 parts by weight of xylene. Cumene hydroperoxide is also added in a quantity of one part by weight per 100 parts by weight of the mixture of petroleum resins and maleic anhydride. The mixture is polymerized at 135°-150°C for a time of about 6 hours. At the end of the reaction the xylene is eliminated and a copolymer having the following characteristics is obtained:

melting point: 164°C
viscosity at 25°C in 60 percent toluene solution: Z3
acid value: 32
bromine value: 18.

We claim as our invention:

1. A process for the preparation of petroleum resins from hydrocarbon fractions containing olefin and di-olefins having a boiling range of from about 120° to 220°C which comprises
   a. subjecting said hydrocarbon fraction to prepolymerization in the presence of 2–10 parts by weight activated clays/100 parts of the fraction itself at 25°–35°C for 20–40 minutes with transformation into high-boiling products in quantities equal to about 1–10 percent by weight with respect to the fraction itself;
   b. separating the prepolymerization product from the activated clays to obtain a hydrocarbon solution of the polymer;
   c. distilling said hydrocarbon solution to obtain a residual hydrocarbon fraction having a maximum boiling point of 210°–230°C;
   d. subjecting the residual hydrocarbon fraction to polymerization in the presence of 0.1–1.0 parts by weight to 100 parts by weight of the fraction of Friedel-Crafts catalyst at 25°–70°C for 20–90 minutes with conversion into polymer of a quantity equal to or smaller than about 40 percent by weight with respect to the hydrocarbon fraction fed to the prepolymerization;
   e. treating the product from step (d) with active earths in a quantity of 2–10 parts to 100 parts of said product for 1–60 minutes at 10°–60°C;
   f. separating said product from the active earths and
   g. distilling said product to remove low-boiling constituents therefrom and recovering petroleum resin from the polymerization product having a melting point at 125°–130°C.

2. A process as recited in claim 1, wherein aluminium trichloride, aluminium tribromide and boron trifluoride are used as the Friedel-Crafts catalysts.

3. A process as recited in claim 1, wherein in the polymerization a quantity of polymer of from about 20 to 35 parts by weight per 100 parts by weight of the hydrocarbon fraction fed to the pre-polymerization is formed.

4. Petroleum resins obtained by the process of claim 1.

* * * * *